Figure 1:
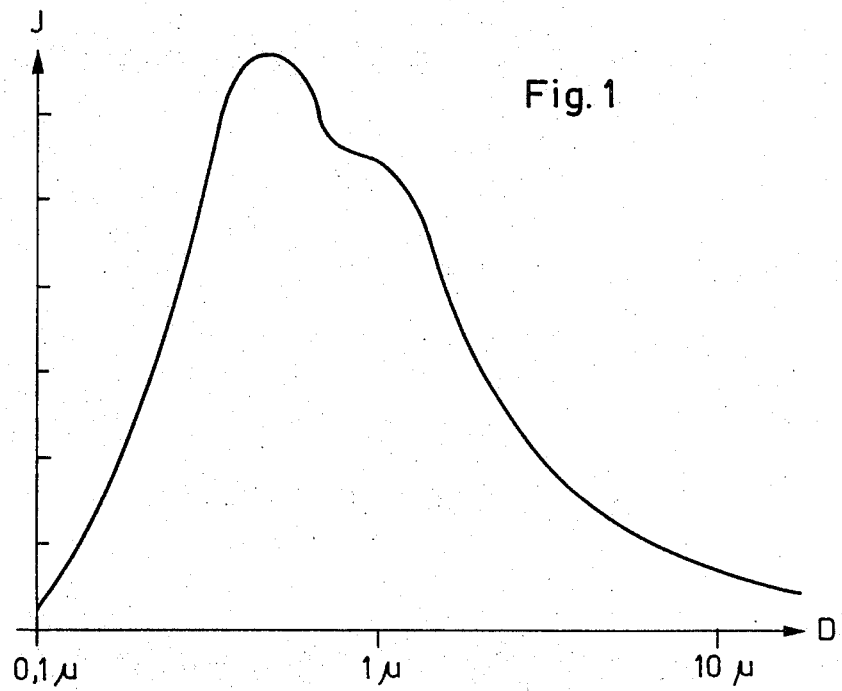

United States Patent [19]

Sigrist

[11] 3,787,123
[45] Jan. 22, 1974

[54] METHOD AND APPARATUS FOR MEASURING THE WEIGHT OF SOLID PARTICLES SUSPENDED IN A CARRIER GAS

[76] Inventor: Willy Sigrist, Ennetbuergen, Switzerland

[22] Filed: Mar. 27, 1972

[21] Appl. No.: 238,197

[30] Foreign Application Priority Data
Mar. 29, 1971 Switzerland.......................... 4552/71

[52] U.S. Cl....................... 356/103, 73/28, 250/218
[51] Int. Cl. ............................................ G01n 21/26
[58] Field of Search........................... 73/19, 28, 53; 356/102–104, 207; 250/218

[56] References Cited
UNITED STATES PATENTS
2,909,960   10/1959   Orr et al. .............................. 356/103
2,932,966    4/1960   Grindell................................. 73/28
3,114,877   12/1963   Dunham .............................. 73/28 X
3,679,973    7/1972   Smith et al........................... 73/28 X Primary Examiner—Ronald L. Wibert
Assistant Examiner—F. L. Evans

[57] ABSTRACT

The weight of particles suspended in a carrier gas is determined regardless of particle size by electrically charging the suspended particles in the carrier gas, thereafter jointly passing the carrier gas and a stream of pure gas under conditions of at least approximately laminar flow through an electric field arranged to cause a portion of the charged particles to migrate into the pure gas, and thereafter separating the initially pure gas from the carrier gas and measuring the amount of particles suspended in the initially pure gas by conventional means. It is shown that the measured values obtained are independent of the particle size and provide an indication of the weight of particles suspended in the carrier gas.

6 Claims, 3 Drawing Figures

3,787,123

METHOD AND APPARATUS FOR MEASURING THE WEIGHT OF SOLID PARTICLES SUSPENDED IN A CARRIER GAS

This invention relates to the determination of the weight of suspended solid particles in a carrier gas, and particularly to an improved method and apparatus for measuring the weight of solid particles suspended in a carrier gas by means of optical apparatus.

It is known to determine the concentration of solid particles suspended in air or other carrier gases by means of optical devices. A beam of light is directed toward a stream of the gas, and the amount of light absorbed from the incident beam is determined by measuring the intensity of the transmitted light, or the amount of light scattered from the incident beam in a transverse direction is measured. An abundance of apparatus for performing either measurement is commercially available.

It is a common shortcoming of the known instruments that the readings obtained on carrier gases containing equal weights of suspended solids in a unit of volume differ significantly in response to differences in the color, shape, index of refraction, and particle size of the suspended material. As compared to particle size, the other parameters are relatively unimportant. At most, they can jointly affect the result of a measurement by a factor of 2 or 3. Moreover, they can be held reasonably constant for many installations requiring control of particulates in emitted gases.

For an equal amount of particles suspended in a carrier gas, the values indicated by instruments measuring light absorption or light scattering have a distinct maximum at a particle size of about 0.3 $\mu$. For particles greater than 1 $\mu$, the instrument readings for visible light are proportional to the actual weight divided by the particle diameter. If the particle size of the suspended solids varies by a factor of 20, an equal variation is indicated by the optical instruments even though the weight of the suspended material and all other variables are held constant.

Particles having diameters greater than 1 $\mu$ predominate in the combustion gases discharged from power plants and garbage incinerators equipped with filters loaded to capacity, and the quantitative measurement of such particles in the filtered combustion gases thus is necessary for monitoring the filters. Relatively complex and costly devices have been proposed for overcoming the errors due to changes in particle size distribution which are inherent in the afore-described optical methods, but they have not been found entirely satisfactory.

The primary objects of the invention are a simple method of optically measuring the weight of suspended solid particles regardless of their size, and the provision of apparatus suitable for performing the method, and capable of producing data which can be converted readily to reliable weight values even if the suspended particles are of unknown size.

According to the method of the invention, the solid particles suspended in a carrier gas are electrically charged. The carrier gas having the charged particles suspended therein and another gas substantially free from suspended solid particles are then made to flow in contiguously adjacent parallel streams which are passed jointly through an electric field transverse to the common direction of flow. The field must be of sufficient strength to cause migration of a portion of the charged particles from the carrier gas into the other gas, and the other gas is then separated from the carrier gas and subjected to measurement of such optical properties as absorption or scattering of light. As will presently be shown, the readings of such properties are independent of particle size and uniquely correlated to the weight of the suspended particles per unit volume of the carrier gas so that the readings may be directly translated into weight per volume data by means of a calibration chart.

The apparatus necessary for performing the method may consist essentially of two elongated conduits having respective parallel, transversely juxtaposed portions separated by a common longitudinal wall. The wall has an opening, and a device for electrostatically charging the suspended particles in a carrier gas is arranged in one of the conduits upstream from the wall opening. Electrodes are offset from the opening transversely of the direction of conduit elongation, and the other conduit leads from the opening in the common wall toward the measuring apparatus in a longitudinal direction away from the afore-mentioned charging device. In operating the apparatus, the carrier gas to be tested is fed to the one conduit while another, relatively pure gas flows in the other conduit. The charged particles migrate in the electric field through the wall opening and are then carried by the other gas to the measuring station.

Figure 2:
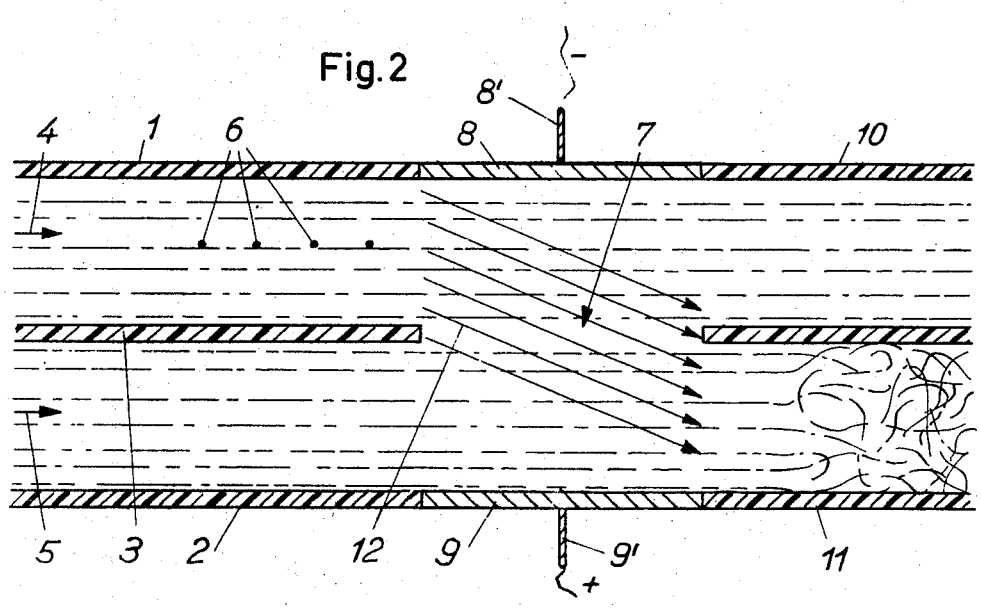
Figure 3:
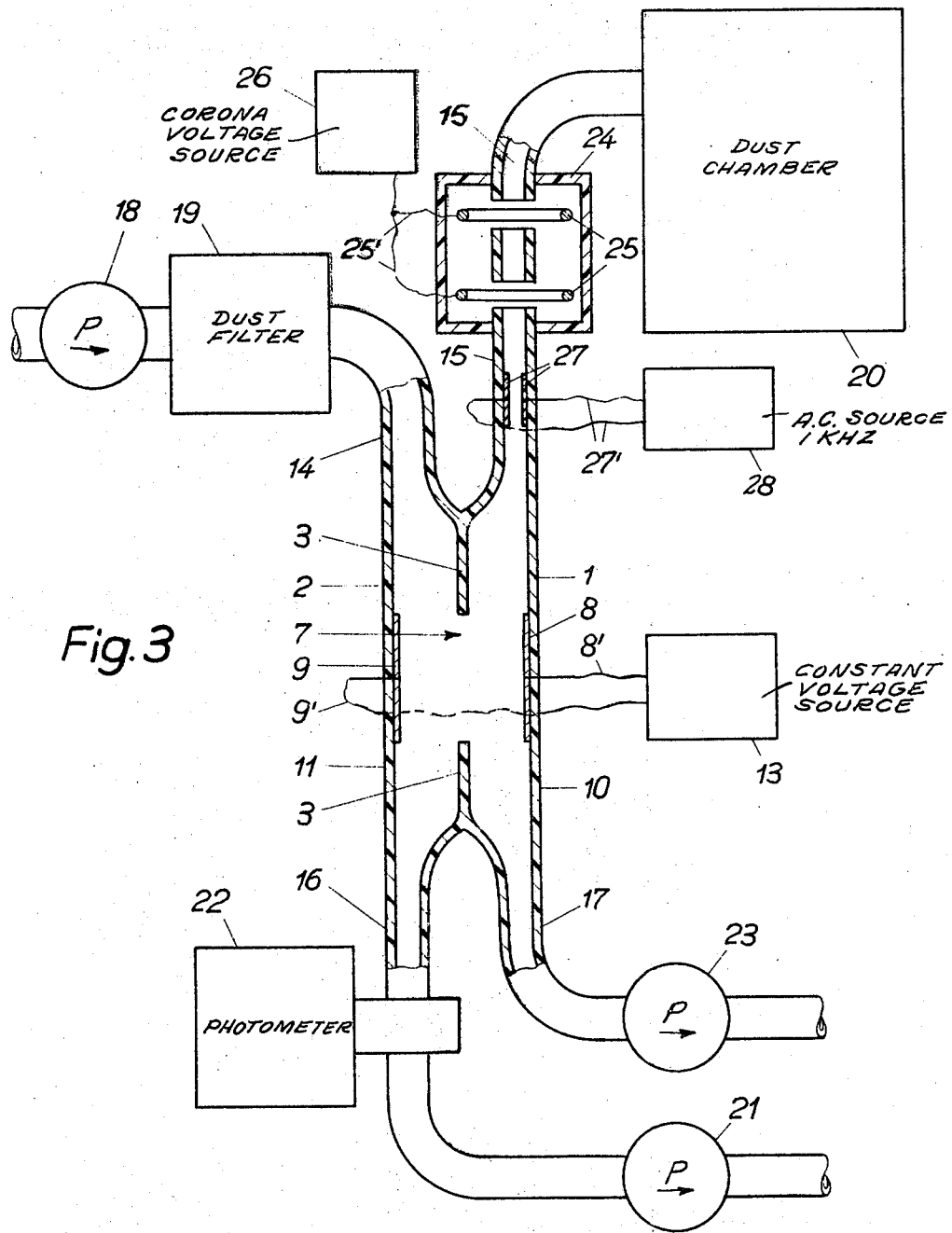

Other features, additional objects, and many of the attendant advantages of this invention will readily be appreciated as the same becomes better understood by reference to the following description of a preferred embodiment when considered in connection with the appended drawing in which:

FIG. 1 diagrammatically illustrates the relationship of the size of an equal weight of suspended particles to the readings of scattered light when carrier gas having fractions of uniform particle size suspended therein is subjected to analysis for light scattering;

FIG. 2 shows apparatus of the invention in fragmentary, sectional elevation; and FIG. 3 is a block diagram of the apparatus of FIG. 2.

In FIG. 1, the amount of scattered light J in linear units is plotted as a function of the logarithm of particle size, as determined with a conventional instrument for measuring light scattering by solid particles in a carrier gas. The measurements on which the illustrated curve are based were performed under otherwise uniform conditions, including the same ratio of particle weight to gas volume, for each of the particle fractions of uniform size that were tested. The gas was air, and the particles were fly ash. The measurements were performed with visible light. The plotted results are typical also of other gases and types of particles.

The curve shows a maximum value for J at a particle diameter D of approximately 0.3 $\mu$, and the value of J is proportional for particles of 1 $\mu$ or greater to the weight G of suspended particles divided by the diameter thereof. This relationship is expressed by the equation $$J = K_1 \cdot G/D$$

wherein $K_1$ is a proportionality factor constant for the apparatus and method employed. The curve illustrates the difficulties encountered in an attempt to measure the weight of particles suspended in a carrier gas when employing conventional methods.

Apparatus of the invention is shown in FIG. 2 only to the extend needed for an understanding of the invention. The ilustrated apparatus essentially consists of two elongated conduits 1, 2 of rectangular cross section whose illustrated portions are parallel and transversely juxtaposed. They are separated partly by a common wall 3. As indicated by an arrow 4, a stream of the contaminated carrier gas is pumped or otherwise caused to flow through the conduit 1 under conditions in which such flow is predominantly laminar. A stream of gas practically free of suspended particles, such as ordinary ambient air, is similarly caused to flow in the conduit 2 as indicated by the arrow 5. The velocities, pressures, and temperatures of the two gases should be as closely similar as possible.

A grid of wires 6 is arranged in th conduit 1 and connected to a high-voltage generator capable of charging the suspended particles in the contaminated gas to saturation in a manner conventional in electrostatic dust precipitators. The saturation charge of each particle is $0.75E_oD^2$ wherein $E_o$ is the field strength in the charging zone and D is the particle diameter.

Downstream from the grid 6, the common wall 3 has an opening 7 extending over the full width of the wall, and the opposite walls of the two conduits carry respective electrodes 8, 9 approximately coextensive with the opening 7 and connected to a source of constant voltage, not shown, by leads 8', 9'. In the absence of an electric field between the electrodes 8, 9, the two streams of gas flow into respective downstream parts 10, 11 of the conduits 1, 2 without mixing at the opening 7 to a significant extent.

When the electrodes 8, 9 are energized, the charged particles move across the opening 7 from the contaminated gas stream in the conduit 1 toward the pure gas stream in the conduit 2 as indicated by arrows 12. The velocity W of the charged particles transverse to the flow direction of the gases is constant, and according to Stoke's law $$W = E_o \cdot E \cdot v \cdot D$$

wherein $E_o$ and D are as defined above, E is the strength of the field between the electrodes 8, 9, and $v$ is the viscosity of the two gases which may be assumed to be equal and constant without introducing a significant error. As long as $E_o$ and E are held constant, the particles migrate transversely at a velocity which is directly proportional to their diameter.

The voltage applied to the electrodes 8, 9 must be chosen so that even the largest particles present are not precipitated, but remain suspended in the air stream in the conduit part 11 when they leave the electric field. A portion of the entire suspended phase is thus diverted from the carrier gas in the conduit 1 into the pure gas in the conduit 2, the magnitude of the diversion being specific for each particle size fraction. Particles of greater diameter are thus more numerous in the conduit part 11 relative to smaller particles than in the original contaminated gas. In other words, if the particles originally present in the contaminated gas stream are considered as a plurality of fractions consisting each of particles of practically uniform size, each fraction is represented in the conduit part 11 in a concentration directly proportional to the particle diameter in the fraction and to its concentration in the conduit 1. Assuming the particles in each fraction to be of uniform specific gravity, they are not only of uniform diameter, but also of uniform weight.

The weight G of each fraction in a unit volume of gas in the conduit part 11 may thus be represented by the equation $$G = K_2 \cdot D \cdot G_o$$

wherein $K_2$ is a constant factor for the apparatus employed as long as all operating variables, such as voltages and flow velocities, are kept constant, and $G_o$ is the weight of the fraction under consideration in a unit volume of the original contaminated gas entering the conduit 1.

The solid particles are mixed uniformly in the conduit part 11 with the stream of pure gas. The baffles employed for creating the desired turbulence have been omitted since they are entirely conventional and need to be placed much farther from the opening 7 than can be shown in the drawing, and the stream of initially pure air having solid particles suspended therein is led by the conduit part 11 to the same non-illustrated, but conventional optical instrument by means of which the curve of FIG. 1 was established. As mentioned above, the amount of scattered light J received by the instrument from the particles of each fraction is a constant times the quotient of the particle weight divided by the particle diameter:

$$J = K_1 \cdot G/D$$

and it has been shown that the weight of the particles of the fraction which reach the conduit part 11 is $$G = K_2 \cdot D \cdot G_o$$

When the two last-mentioned equations are combined, the light received by the instrument is found to be $$J = K_1 \cdot G_o/D \cdot K_2 \cdot D = K_1 \cdot K_2 \cdot G_o$$

and a function of $G_o$ alone, that is, of the weight of the fraction originally present in the contaminated gas entering the conduit 1. The total light received by the instrument is a function of the total weight of the particles in the contaminated gas.

FIG. 3 shows a complete installation incorporating apparatus of the invention in sectional plan view, partly schematic. As in the apparatus shown in FIG. 2 the illustrated apparatus comprises two elongated inlet conduit portions 1,2 which are parallel and transversely juxtaposed, and which are separated by a common wall 3. The common wall 3 has an opening 7 and then separates two parallel and transversely juxtaposed outlet conduit portions 10, 11. Again opposite walls of the conduits carry respective electrodes 8, 9 coextensive with the opening 7 and sonnected to a source 13 of constant voltage by leads 8', 9'.

Each conduit portion 1, 2, 10, 11 communicates with a respective separate conduit 14, 15, 16, 17. Conduit 14 supplies ambient air free of suspended particles by means of a first air pump 18 followed by a dust filter 19. Conduit 15 supplies a laminar stream of contaminated carrier gas drawn from a dust chamber 20. Through conduit 16 a second pump 21 exhausts a mixture of pure air and contaminated carrier gas through an optical measuring instrument 22 whilst the remaining portion of contaminated gas is exhausted through conduit 17 by means of a third pump 23.

In a typical embodiment all pumps 18, 21, 23 have an air delivery capacity of 30 litres per minute even if the pressure in the dust chamber, which may be a chimney or the like, slightly departs from atmospheric pressure.

To charge dust particles in the contaminated gas drawn from dust chamber 20, a charging device is disposed along conduit 15 between dust chamber 20 and conduit portion 1. This device comprises an ion or electron discharge chamber 24 through which conduit 15 passes. In chamber 24 conduit 15 is interrupted at two locations at which two annular discharge devices 25, for example corona discharge devices, are disposed which are connected to a source 26 of high voltage by leads 25'. Instead of the corona discharge device shown device 25 may be an annular ion discharge device, negative ions being supplied in that case from ion source 26.

To bind the ions injected into the contaminated gas stream to the dust particles, the gas stream is conduit 15 passes through a charge portion of conduit 15 having two oppositely disposed electrodes 27 connected to a source 28 of alternating voltage by leads 27'. In a typical case the alternating voltage of source 28 had a frequency of 1 kHz and was of such magnitude that between electrodes 27 an alternating electric field with a peak intensity of 1 kV/cm was prevailing. This and similar devices for charging particles in a contaminated gas stream are well known from electrical precipitators.

In a typical embodiment source 13 of constant voltage energizing the electrodes 8, 9 was of such value that the strength of the electric field between said electrodes was 500 V/cm. As described before in connection with FIG. 2 the charged particles in the contaminated gas stream supplied by conduit 15 and conduit portion 1 move across the opening 7 toward the pure gas stream in the conduit 14 and conduit portion 2 to mix with the pure gas stream in conduit portion 11 and conduit 16. The optical dust measuring instrument 22 was a photometer of the type Sigrist UP 52B3/5TNF3 which has been calibrated with a polystyrene aerosol of 1 $\mu$ size. The flow velocity of the gas in the instrument 22 does not influence the optical measurement.

What is claimed is:

1. In a method of measuring the weight of solid particles suspended in a carrier gas by optical means, the improvement which comprises:
   a. electrically charging the solid particles suspended in said carrier gas;
   b. causing the carrier gas having the charged particles suspended therein and another gas substantially free from suspended solid particles to flow in contiguously adjacent streams in a common direction;
   c. jointly passing said streams through an electric field transverse to the common direction of flow of said streams, said field being sufficient to cause migration of a portion of said charged particles from said carrier gas into said other gas;
   d. thereafter separating said streams; and
   e. determining an optical property of the separated other gas indicative of the quotient of weight divided by the diameter of the particles in said other gas as a measure of the weight of the solid particles initially suspended in said carrier gas.

2. In a method as set forth in claim 1, said optical property being determined by measuring the light of a transverse incident light beam scattered by the particles suspended in said other gas.

3. A method as set forth in claim 1, wherein said particles in said other gas have a diameter of at least one micron.

4. In an apparatus for determining the weight of solid particles suspended in a carrier gas by means of optical measuring apparatus, the improvement comprising:
   a. first guide means for causing two streams of gas to flow in a common direction in contiguously adjacent streams;
   b. electrostatic charging means for electrically charging solid particles suspended in one of said streams;
   c. two electrodes offset from said two streams in opposite directions transversely of the common direction of flow of said streams and downstream from said charging means;
   d. means for applying an electric potential to said electrodes and for thereby generating an electric field between said electrodes in said two streams; and
   e. second guide means for separating said streams and for guiding the separated other one of said streams from said electric field to said measuring apparatus.

5. In an apparatus as set forth in claim 4, said first and second guide means including two elongated conduits having respective parallel, transversely juxtaposed portions separated by a common longitudinal wall formed with an opening therein, respective parts of said portions extending from said opening in opposite longitudinal directions, said electrostatic charging means being located in one of said conduits and offset from said opening in one longitudinal direction, the part of the other conduit leading from said opening toward said measuring apparatus in a direction opposite to said one longitudinal direction, and said electrodes being oppositely offset from said opening for generating said field in said opening.

6. In an apparatus as set forth in claim 4, said first and second guide means being offset from said electric field in opposite directions.

* * * * *